(12) United States Patent
Segura et al.

(10) Patent No.: US 9,733,390 B2
(45) Date of Patent: Aug. 15, 2017

(54) DOWNHOLE TOOL MEASUREMENT DEVICE MOUNTING SYSTEM AND METHOD

(71) Applicant: Bench Tree Group, LLC, Georgetown, TX (US)

(72) Inventors: Pedro R. Segura, Round Rock, TX (US); Rene M. Rey, Georgetown, TX (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

(21) Appl. No.: 15/334,145

(22) Filed: Oct. 25, 2016

(65) Prior Publication Data
US 2017/0102481 A1 Apr. 13, 2017

Related U.S. Application Data

(63) Continuation of application No. 13/098,326, filed on Apr. 29, 2011, now abandoned.

(60) Provisional application No. 61/330,187, filed on Apr. 30, 2010.

(51) Int. Cl.
| | |
|---|---|
| *G01V 11/00* | (2006.01) |
| *E21B 47/01* | (2012.01) |
| *E21B 47/024* | (2006.01) |
| *G01V 1/52* | (2006.01) |

(52) U.S. Cl.
CPC .......... *G01V 11/005* (2013.01); *E21B 47/01* (2013.01); *G01V 1/52* (2013.01); *E21B 47/024* (2013.01); *G01V 2001/526* (2013.01)

(58) Field of Classification Search
CPC .. G01V 1/52; G01V 11/005; G01V 2001/526; E21B 47/01; E21B 47/024
USPC ........................................................ 73/866.5
See application file for complete search history.

(56) References Cited

U.S. PATENT DOCUMENTS

| | | | | |
|---|---|---|---|---|
| 4,542,647 | A * | 9/1985 | Molnar ................. | E21B 47/022 175/45 |
| 5,467,083 | A * | 11/1995 | McDonald ............ | E21B 47/122 340/854.4 |
| 6,351,891 | B1 * | 3/2002 | MacGugan ........... | E21B 47/024 33/304 |
| 6,499,545 | B1 * | 12/2002 | MacGugan ........... | E21B 47/024 166/66 |
| 2001/0027864 | A1 * | 10/2001 | Vaynshteyn ...... | E21B 43/11857 166/250.01 |
| 2003/0183423 | A1 * | 10/2003 | Brazil ................... | E21B 47/024 175/61 |
| 2003/0236627 | A1 * | 12/2003 | Estes ...................... | G01C 19/38 702/9 |

(Continued)

*Primary Examiner* — Herzon E Williams
*Assistant Examiner* — David Z Huang
(74) *Attorney, Agent, or Firm* — Dunlap Codding, P.C.

(57) ABSTRACT

A downhole tool measurement device mounting system and method are provided. The mounting system may include a chassis and a first sensor area and a second sensor area in the chassis capable of housing a first sensor and a second sensor that measure a characteristic along a first axis and a second axis, respectively. The system may also have a sensor assembly mounted in a cavity of the chassis in a third sensor area wherein a sensing axis of the sensor assembly is orthogonal to the first and second axes, the sensor assembly having a block and an orthogonal sensor mounted in the block to form a monolithic assembly that is secured into the cavity.

15 Claims, 2 Drawing Sheets

(56) References Cited

U.S. PATENT DOCUMENTS

2007/0289373 A1\* 12/2007 Sugiura ................. E21B 7/062
  73/152.46
2010/0018701 A1\* 1/2010 Peter ....................... E21B 47/01
  166/250.01

\* cited by examiner

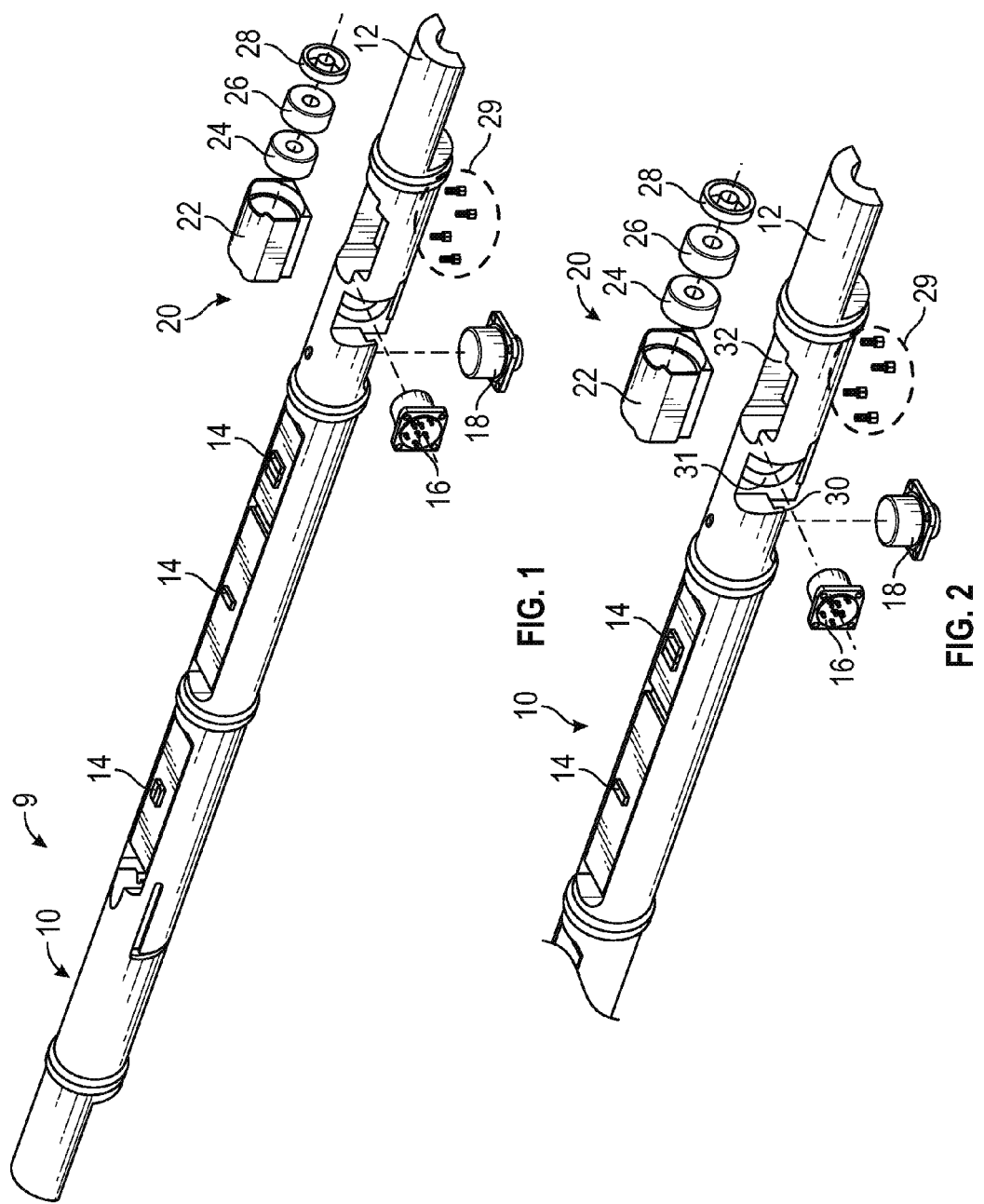

DOWNHOLE TOOL MEASUREMENT DEVICE MOUNTING SYSTEM AND METHOD

CROSS-REFERENCE TO RELATED APPLICATIONS

The present application claims priority to U.S. Provisional Patent Application Ser. No. 61/330,187, filed on Apr. 30, 2010 and the non-provisional application identified by U.S. Ser. No. 13/098,326, filed Apr. 29, 2011, the entire content of both which are hereby incorporated herein for all purposes.

The disclosure relates generally to downhole tools and in particular to downhole survey sensors.

BACKGROUND

A downhole survey instrument typically consists of electronics and various sensors packaged within a chassis usually machined from a cylindrical piece of non-magnetic material. The downhole survey instrument is usually a long, slender, assembly, due to the form factor of drilling sensor apparatus in which it is used. These typical instruments also have features that retain and ruggedize the sensors and electronics due to the harsh downhole environment. The survey assemblies typically include an inclinometer which sometimes consists of three or more, typically orthogonally positioned, accelerometers. An accelerometer pair is usually mounted normal to the elongated chassis axis, and a third accelerometer, usually called the Z axis accelerometer, is typically coaxial to the instrument chassis long axis.

In most typical systems, the 'Z' axis accelerometer for a downhole survey sensor is installed at one end of the elongated chassis since the cross-section of the accelerometer consumes a large percentage of the available chassis cross section. Furthermore, the chassis material cross-section must provide the structural integrity needed to maintain the relative positions of the sensors in the assembly through handling and use in the harsh downhole environment.

The typical configuration consists of installing an accelerometer into a coaxial pocket machined into one end of the instrument chassis and then retaining it with a threaded member or members that clamp the accelerometer in place. The disadvantage of this scheme is that it 1) limits placement of the 'Z' axis accelerometer near one end of the assembly; 2) If the 'Z' axis accelerometer is not located at the end of the chassis, additional members may need to be attached which complicates the sensor; 3) it makes routing of conductors difficult as not much cross-section remains for thru-wireways in the chassis; and 4) it takes more time to replace accelerometer due to the complexity of the assembly so that, for example, end components would need to be removed/un-wired to access the accelerometer.

Another configuration simply uses an elastomeric compound to 'glue' the accelerometer in place. This has the disadvantage of poor stability (since the accelerometer may be able to move) and difficult replacement/rework since the "glue" must be removed.

Thus, it is desirable to provide a mount for downhole survey sensor that overcomes the limitations and drawbacks of typical systems and it is to this end that the disclosure is directed.

BRIEF DESCRIPTION OF THE DRAWINGS

FIG. 1 illustrates an example of an implementation of a mounting for a survey sensor;

FIG. 2 illustrates more details of the distal end of the mounting for a survey sensor;

DETAILED DESCRIPTION OF ONE OR MORE EMBODIMENTS

Figure 3:
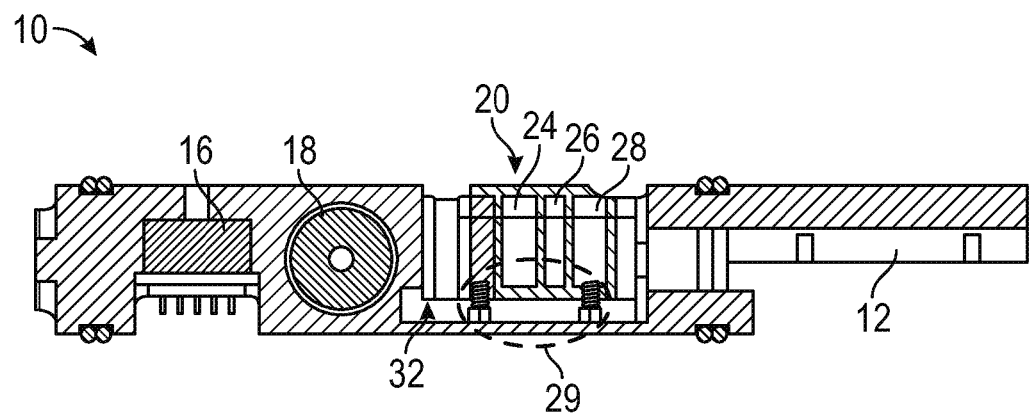
FIG. 3 is a sectional side view of the mounting for a survey sensor.

The disclosure is particularly applicable to a downhole survey sensor with accelerometers and it is in this context that the disclosure will be described. It will be appreciated, however, that the mounting system and method has greater utility since it can be used to mount other types of sensors and may be used for a variety of different industries in addition to the drilling/boring examples described below.

In one implementation, an accelerometer may be mounted, but the mounting device and mounting method may be used for other sensors and the mounting of other sensors is within the scope of this disclosure. In one implementation, an accelerometer subassembly may be mounted into/onto features machined on/in a chassis body 12 as shown in FIGS. 1 and 2. However, using the mounting device and method, the accelerometer assembly may be installed along axes (the x axis and/or they axis) other than the typical z axis. In general terms, the accelerometer may be mounted into a 'block' that contains features for rigidly attaching the accelerometer. For example, the "block" may be a configuration in which a flange of the accelerometer is captured between a shoulder within the block and the shoulder of a threaded member or intermediate member that is captured by a threaded member. The block may be fastened to the chassis, such that the accelerometer has its sensing axis parallel to the chassis axis. The block and chassis may both have machined features, in this case shoulders/ledges, that, when the sensor is fully assembled, ensures a stable relative position between them and hence between other sensors and the Z accelerometer.

FIG. 1 illustrates an example of an implementation of a mounting 10 for a survey sensor which is also shown in more detail in FIG. 2. As shown in FIGS. 1 and 2, an implementation of the mounting 10 may include the chassis 12 into which a sensor, such as an accelerometer, may be mounted. The chassis 12 of the sensor body may have one or more circuits or printed circuit boards 14 attached to the chassis body as shown adjacent to the sensors. In one example, the circuits/printed circuit boards 14 may be mounted on a side of the chassis that is the same side on which at least one of the sensors are installed. As shown in FIG. 1, a tool 9 into which the mount 10 is connected/attached/affixed/part of may be significantly larger than the mount and the mount 10 may be used with various different types of tools. In the example in FIGS. 1 and 2, the mount 12 may house a first sensor 16 and a second sensor 18, such as an X axis accelerometer and a Y axis accelerometer when the two accelerometers are mounted on different sides of the chassis 10 as shown. As shown in FIG. 2, each of the sensors 16, 18 may be mounted and secured into a cavity 30, 31 in the chassis. The mount may be used for various downhole sensors. For example, as described below in more detail, the sensor may be a magnetometer or gyroscope.

In the example in FIGS. 1 and 2, the mount 12 also may house a third sensor assembly 20, such as a Z axis accelerometer assembly, that mounts in and is secured in a third cavity 32 in the chassis 12. The third accelerometer assembly 20 may further comprise a block 22 into which an accelerometer 24 is mounted. The third accelerometer assembly 20 may further comprise a retaining cap 26 that sits on top of the accelerometer 24 inside of the block 22. The third accelerometer assembly 20 may further comprise a retainer member 28, that may be threaded or may use another mechanism to secure the accelerometer in the block that releasably secures the accelerometer 24 and the retaining cap 26 into the block 22 to create a monolithic accelerometer assembly. Alternatively, the block 22 may be a configuration in which a flange of the accelerometer 24 is captured between a shoulder within the block (not shown) and a shoulder of a retainer member 28 of the retainer cap 26 that is captured by the retainer member 28. The monolithic accelerometer assembly may then be inserted into the cavity 32 and secured or fastened into the cavity so that, for example, the accelerometer 24 has its sensing axis parallel to the chassis axis. The monolithic accelerometer assembly may be secured to/fastened to the cavity/chassis by various mechanisms. For example, the block 22 and chassis cavity 32 may both have machined features, such as shoulders/ledges 30 (one of which is shown in FIG. 4), that, when the sensor is fully assembled, ensures a stable relative position between them and hence between other sensors and the accelerometer 24. Alternatively, as shown in FIGS. 1 and 3, the mount may have one or more securing mechanisms 29, such as screws, that secure the block 22 to the chassis.

Figure 4:
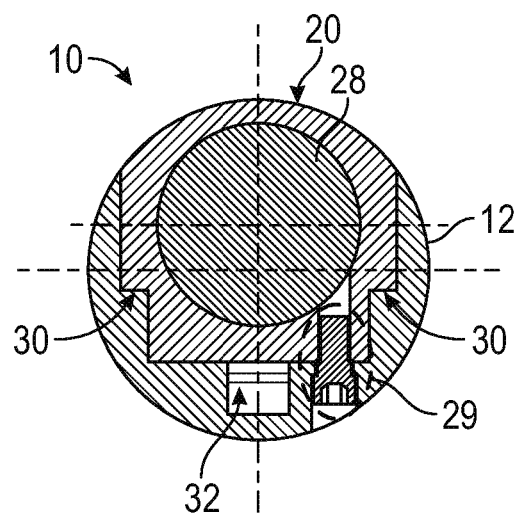
FIG. 4 is a sectional end view of the mounting for a survey sensor.

FIG. 3 is a sectional side view of the mounting 10 for a survey sensor. In this example, the sensors 16, 18, 20 are mounted on sides of the chassis 12 so that acceleration in the X axis, acceleration in the Y axis and acceleration in the Z axis can be measured. It is important to note that the third sensor assembly 20 does not need to be coaxial to the chassis 12 or the other sensors 16, 18. In particular, the ability to measure each different axis signal is based on the sensor axes being orthogonal and the configuration shown in FIGS. 1-4 satisfies this requirement while having the third sensor assembly 20 that is not coaxial to the chassis 12 or the other sensors 16, 18. The configuration shown in FIG. 1-4 is possible due to an offset that allows the mount to utilize a typically sized mini accelerometer. The configuration allows for the close grouping of the sensors (the inclinometer or accelerometers) if desired. In addition, the configuration enables and permits the placement of the third sensor at any location along the length of the survey sensor while maintaining a rugged, rigid, one-piece, chassis. For example, locating the sensors closer to the magnetometer and having a more rigid structure between them is important to survey accuracy and stability.

Returning to FIG. 3, the figure also shows the securing mechanisms 29 passing through the passing through the chassis 12 and securing the third sensor assembly 20 to the chassis 12. FIG. 4 is a sectional end view of the mounting 20 for a survey sensor in which the securing mechanisms 29 passing through the chassis 12 can be seen.

The mount, as shown in FIGS. 3 and 4, has a passageway 32 underneath the sensor assembly 20. The passageway may be used as a wireway for conductors that need to pass through this region of the assembly. Using this configuration, the sensor assembly 20 can be removed and re-installed without needing to remove these conductors.

In an alternative embodiment, the mount may mount a magnetometer sensor or a fluxgate magnetometer sensor. The magnetometer sensor or a fluxgate magnetometer sensor embodiment may also have an accelerometer or a group of accelerometers that are mounted on the downhole assembly. They magnetometer sensor or a fluxgate magnetometer sensor is an independent sensor commonly used in downhole assemblies. A magnetometer is a sensor system that measures a magnetic field. In a guidance system used in downhole assemblies, the common magnetic fields are from the earth's field or from other sources of magnetic fields such as interfering magnetic assemblies or adjacent wells with magnetic material in the well bores. Flux gate magnetometers are commonly used in downhole applications and all known downhole applications of flux gates use Permalloy material. Further details of magnetometers and flux gate magnetometers may be found in U.S. Pat. No. 6,972,563 which is incorporated herein by reference.

For a fluxgate magnetometer sensor, most modern fluxgate designs rely on a tape wound ring core approach which typically allows the combination of two orthogonal measurement axes on the same structure. The traditional material used is commonly known as Supermalloy, with a fairly high squareness BH loop index of some 0.75. Amorphous materials can offer improvements in squareness BH loop index to exceed 0.85 and much higher initial permeabilities, coupled with lower excitation current. All these qualities allow for a fluxgate structure which is smaller in size for equivalent sensitivity when compared with the traditional approach, plus lower drive current needs, which is highly beneficial since the typical measurement while drilling (MWD) string is battery operated. Amorphous material also exhibits lower magnetostriction effects, which produces better signal to noise ratios. The lower core losses verses temperature also allow the use of thicker ribbon, leading to a larger effective cross sectional area for a given OD/ID, which further improves the volumetric efficiency. An example of improved amorphous materials include Magnetic Metals DC annealed 9001.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A survey sensor, comprising:
   a chassis formed of a single unit having a body, the body having a first end, a second end and a chassis axis extending from the first end to the second end;
   a X-axis sensor mounted on a first side of the body of the chassis;
   a Y-axis sensor mounted on a second side of the body of the chassis;
   a monolithic Z-axis sensor assembly mounted on a third side of the body of the chassis, the Z-axis sensor assembly including a Z-axis sensor mounted in a block, the monolithic Z-axis sensor assembly mounted within the third side of the body of the chassis such that a sensing axis of the Z-axis sensor assembly is offset from a center of the body of the chassis and parallel to the chassis axis, and such that a passageway is formed between the block and the chassis.

2. The survey sensor of claim 1, wherein the X-axis sensor, the Y-axis sensor, and the Z-axis sensor are accelerometers.

3. The survey sensor of claim 1 wherein the sensor assembly further comprises a retaining cap that is adjacent the Z-axis sensor and a retainer wherein the retainer secures the retainer cap and the Z-axis sensor to the block.

4. The survey sensor of claim 3, wherein the retainer is a threaded retainer that screws into the block.

5. The survey sensor of claim 1, wherein the Z-axis sensor has a flange that is captured by the block to secure the Z-axis sensor to the block.

6. The survey sensor of claim 1 further comprising one or more circuit boards mounted on the chassis wherein at least one circuit board is mounted on a side of the chassis on which one of the X-axis, Y-axis, and Z-axis sensor are mounted.

7. The survey sensor of claim 1, wherein X-axis sensor, Y-axis sensor, and Z-axis sensor are mounted within the chassis.

8. The survey sensor of claim 1, wherein each of the X-axis, Y-axis, and Z-axis sensors are one of a magnetometer and a gyroscope.

9. The survey sensor of claim 1, wherein the Z-axis sensor is located remotely from the first end and the second end of the body.

10. The survey sensor of claim 1, wherein each of the X-axis, Y-axis and Z-axis sensors are one of a magnetometer sensor and a fluxgate magnetometer sensor.

11. The survey sensor of claim 10, wherein the fluxgate magnetometer sensor is manufactured from an amorphous material.

12. The survey sensor of claim 11, wherein the fluxgate magnetometer sensor is manufactured from a material having a BH loop index that exceeds 0.85.

13. A method for making a survey sensor, the method comprising:
- mounting a X-axis sensor and a Y-axis sensor to a chassis formed of a single unit having a body such that the X-axis sensor is mounted on a first side of the body, and the Y-axis sensor is mounted on a second side of the body, the body having a first end and a second end and chassis axis extending from the first end to the second end;
- mounting a Z-axis sensor assembly in a cavity of the chassis wherein a sensing axis of the Z-axis sensor assembly is offset from a center of the body of the chassis and parallel to the chassis axis; and
- wherein mounting the Z-axis sensor assembly further comprises mounting a Z-axis sensor into a block to form a monolithic assembly that is mounted into the cavity of the chassis to form a passageway between the block and the chassis.

14. The method of claim 13, wherein mounting the Z-axis sensor assembly further comprises inserting a retainer cap into the block after the Z-axis sensor and securing a retainer to the block to secure the retainer cap and the Z-axis sensor to the block.

15. The method of claim 13, wherein mounting the Z-axis sensor further comprises capturing a flange of the Z-axis sensor by the block to secure the Z-axis sensor to the block.

* * * * *

UNITED STATES PATENT AND TRADEMARK OFFICE
CERTIFICATE OF CORRECTION

Page 1 of 1

PATENT NO. : 9,733,390 B2
APPLICATION NO. : 15/334145
DATED : August 15, 2017
INVENTOR(S) : Pedro R. Segura and Rene M. Rey It is certified that error appears in the above-identified patent and that said Letters Patent is hereby corrected as shown below:

In the Specification

Column 2, Line 26: After "(the x axis and/or" delete "they axis)" and replace with -- the y axis) --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*